US010859666B1

(12) United States Patent
Kratz et al.

(10) Patent No.: US 10,859,666 B1
(45) Date of Patent: *Dec. 8, 2020

(54) METHOD AND SYSTEM FOR RADIOFREQUENCY LOCALIZATION OF TRANSMITTING DEVICES VIA A MESH NETWORK

(71) Applicant: ZaiNar, Inc., Redwood City, CA (US)

(72) Inventors: Philip Kratz, Redwood City, CA (US); Daniel Jacker, Redwood City, CA (US); Mainak Chowdhury, Redwood City, CA (US); Alexander Hooshmand, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,285

(22) Filed: Mar. 10, 2020

Related U.S. Application Data

(63) Continuation of application No. 16/186,336, filed on Nov. 9, 2018, now Pat. No. 10,627,474, which is a continuation-in-part of application No. 15/644,717, filed on Jul. 7, 2017, now Pat. No. 10,455,350.

(60) Provisional application No. 62/690,476, filed on Jun. 27, 2018, provisional application No. 62/360,446, filed on Jul. 10, 2016.

(51) Int. Cl.
*H04W 24/00* (2009.01)
*G01S 5/02* (2010.01)
*G01S 5/14* (2006.01)
*H04W 84/18* (2009.01)

(52) U.S. Cl.
CPC .......... *G01S 5/0221* (2013.01); *G01S 5/0215* (2013.01); *G01S 5/14* (2013.01); *H04W 84/18* (2013.01)

(58) Field of Classification Search
CPC ......... H04W 4/02; H04W 64/00; H04W 4/33; H04W 84/12; H04W 84/18; H04L 27/22
USPC .............................. 455/456.1; 370/252, 255
See application file for complete search history.

(56) References Cited

U.S. PATENT DOCUMENTS

| | | | | |
|---|---|---|---|---|
| 10,455,350 | B2* | 10/2019 | Kratz | H04W 56/002 |
| 10,627,474 | B1* | 4/2020 | Kratz | G01S 5/0215 |
| 2019/0369201 | A1* | 12/2019 | Akkarakaran | G01S 5/0215 |
| 2019/0373594 | A1* | 12/2019 | Sadiq | H04W 72/046 |
| 2020/0112498 | A1* | 4/2020 | Manolakos | G01S 5/0236 |

* cited by examiner

Primary Examiner — Sonny Trinh
(74) Attorney, Agent, or Firm — Run 8 Patent Group, LLC; Alexander R. Flake; Peter Miller

(57) ABSTRACT

A method including, at each node in each pair of nodes in a network: transmitting an outbound synchronization signal; generating a self-receive signal based on the outbound synchronization signal; detecting the self-receive signal at a self-receive TOA; detecting an inbound synchronization signal; based on the pair of self-receive TOAs and the pair of synchronization TOAs, for each pair of nodes in the network: calculating a pairwise time offset and distance; for each node in the network: based on the set of pairwise distances, calculating a location and a time bias of the node. The method also includes: at each node in the network, detecting a localization signal, transmitted by a device, at a localization TOA; and calculating a location of the device based on, for each node in the network, the localization signal detected at the node, and the time bias and the relative location of the node.

20 Claims, 4 Drawing Sheets

US 10,859,666 B1

METHOD AND SYSTEM FOR RADIOFREQUENCY LOCALIZATION OF TRANSMITTING DEVICES VIA A MESH NETWORK

CROSS-REFERENCE TO RELATED APPLICATIONS

This Application is a continuation application of U.S. patent application Ser. No. 16/186,336, filed on 9 Nov. 2018, which claims the benefit of U.S. Provisional Application No. 62/690,476, filed on 27 Jun. 2018, both of which are incorporated in their entireties by this reference.

U.S. patent application Ser. No. 16/186,336 is also a continuation-in-part application of U.S. patent application Ser. No. 15/644,717, filed on 7 Jul. 2017, which claims the benefit of U.S. Provisional Application No. 62/360,446, filed on 10 Jul. 2016, both of which are also incorporated in their entireties by this reference.

TECHNICAL FIELD

This invention relates generally to the field of radiofrequency localization and more specifically to a new and useful method for localization via a mesh network in the field of radiofrequency localization.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
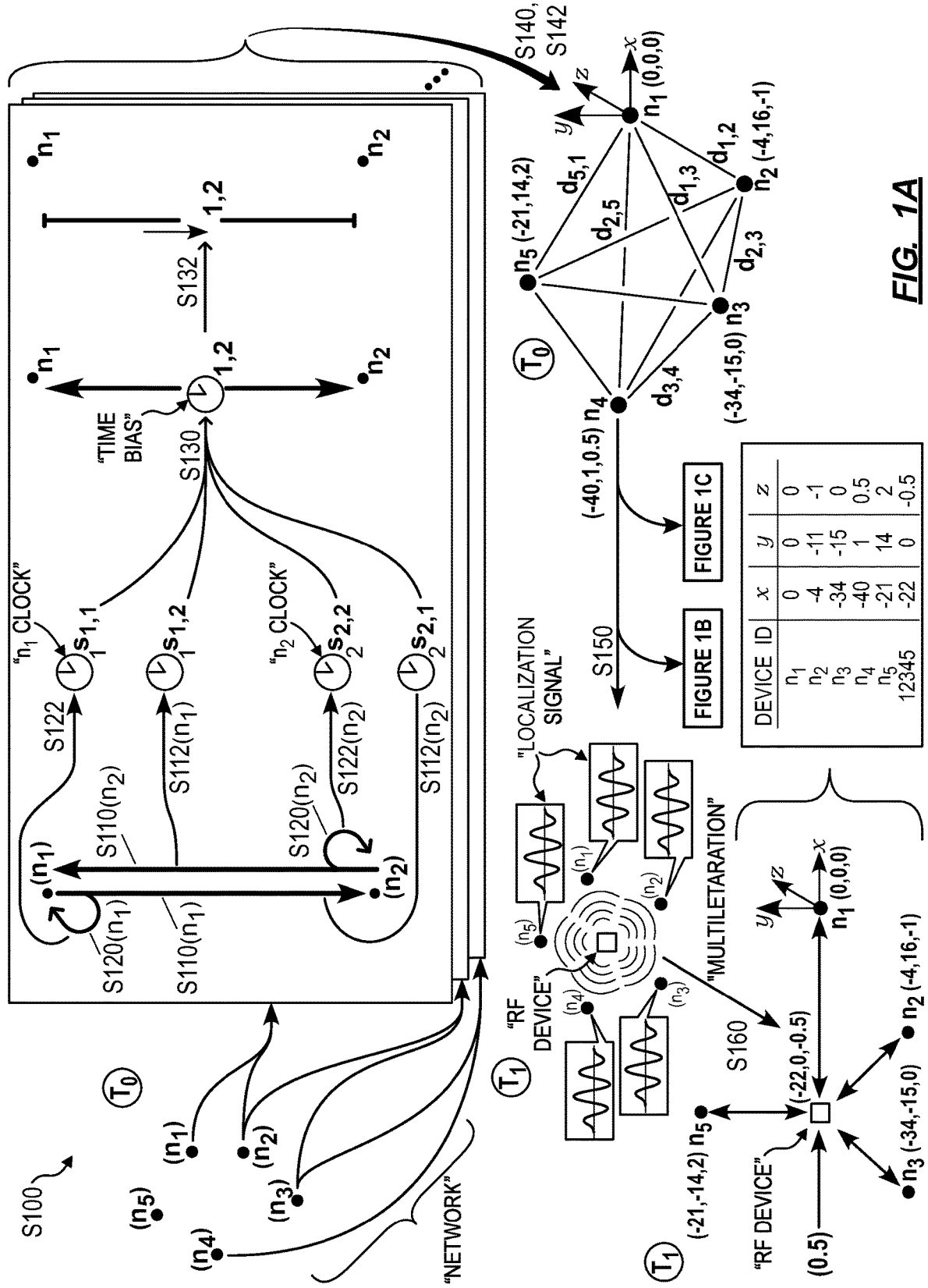
FIGS. 1A, 1B, and 1C are flowchart representations of variations of a method.

As shown in FIG. 1A, a method S100 for detecting a location of a device via a network includes, at each node in each unique pair of nodes in a network: transmitting an outbound synchronization signal in Block Silo; generating a self-receive signal based on the outbound synchronization signal in Block S120; detecting the self-receive signal at a self-receive time-of-arrival (hereinafter "TOA"), in a pair of self-receive TOAs in Block S122; and detecting an inbound synchronization signal, transmitted from an opposing node in the unique pair of nodes, at a synchronization TOA, in a pair of synchronization TOAs in Block S112. The method S100 also includes, based on the pair of self-receive TOAs and the pair of synchronization TOAs, for each unique pair of nodes in the network: calculating a pairwise time offset, in a set of pairwise time offsets, between the unique pair of nodes in Block S130; and calculating a pairwise distance, in a set of pairwise distances, between the unique pair of nodes in Block S132. The method S100 further includes, for each node in the network: based on the set of pairwise distances, calculating a relative location of the node in the network relative to one node in the network in Block S140; and based on the set of pairwise time offsets, calculating a time bias of the node in the network relative to one node in the network in Block S142. The method S100 also includes: at each node in the network, detecting a localization signal, transmitted by a device, at a localization TOA in Block S150; and calculating a location of the device relative to the network based on, for each node in the network, the localization signal detected at the node, the time bias of the node, and the relative location of the node in Block S160.

Figure 1B:
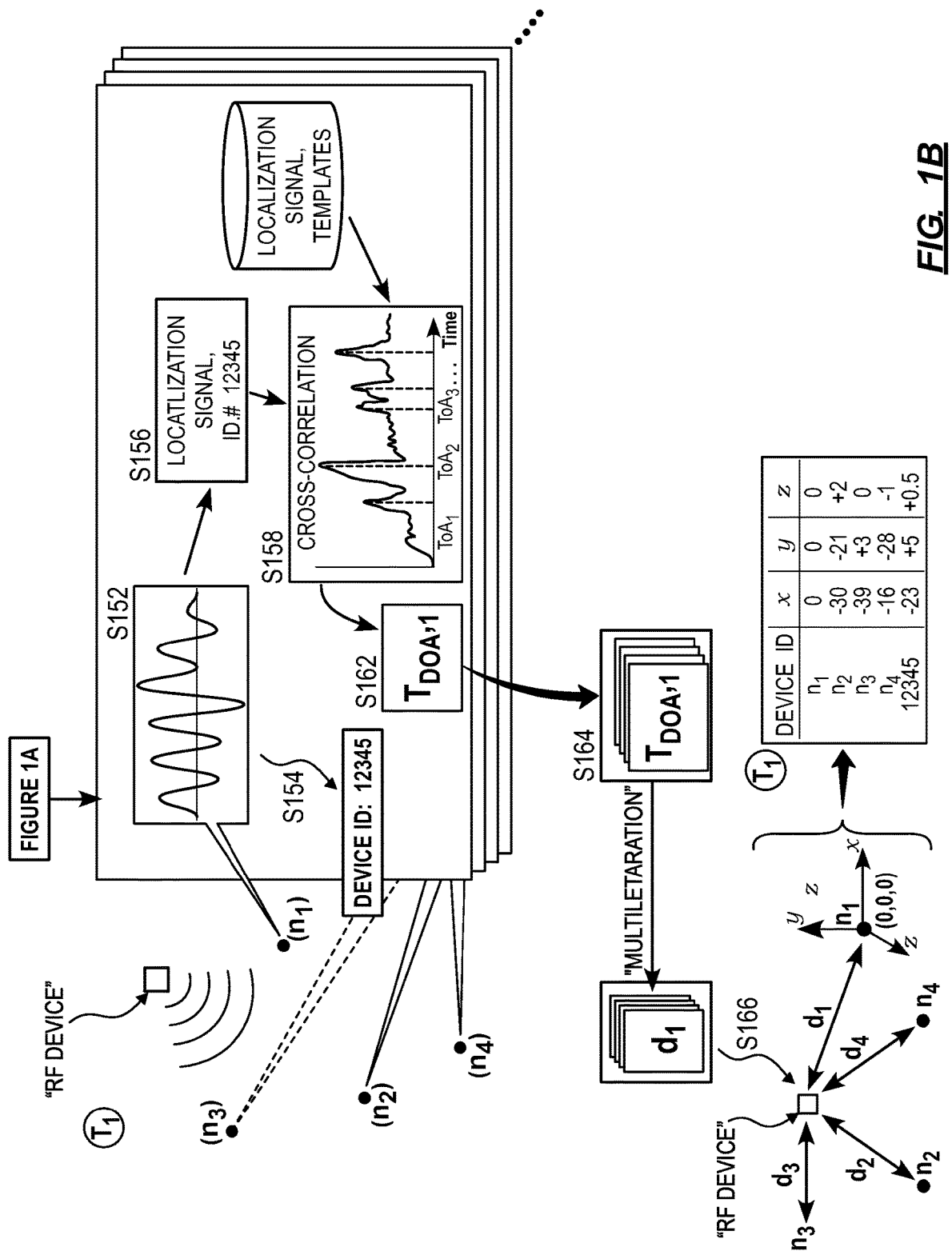

As shown in FIG. 1B, a first variation of the method S100 includes, at each node in the network, each node characterized by a location relative to the network and a synchronized clock relative to a clock of the network: receiving a carrier wave on a multiplexed channel in Block S152; demodulating the carrier wave to detect an identifying signal transmitted by a device in Block S154; detecting, in the carrier wave, a set of localization signals resulting from multipath propagation of the carrier wave in Block S156; and for each localization signal in the set localization signals, calculating a localization TOA, in a set of localization TOAs, of the localization signal in Block S158. The first variation also includes: for each node in the network, selecting a line-of-sight (hereinafter "LOS") TOA from the set of localization TOAs of the node in Block S162; calculating a set of time-differences-of-arrival (hereinafter "TDOAs") based on the LOS TOA for each node in Block S164; and calculating a location of the device based on the set of TDOAs in Block S166.

Figure 1C:
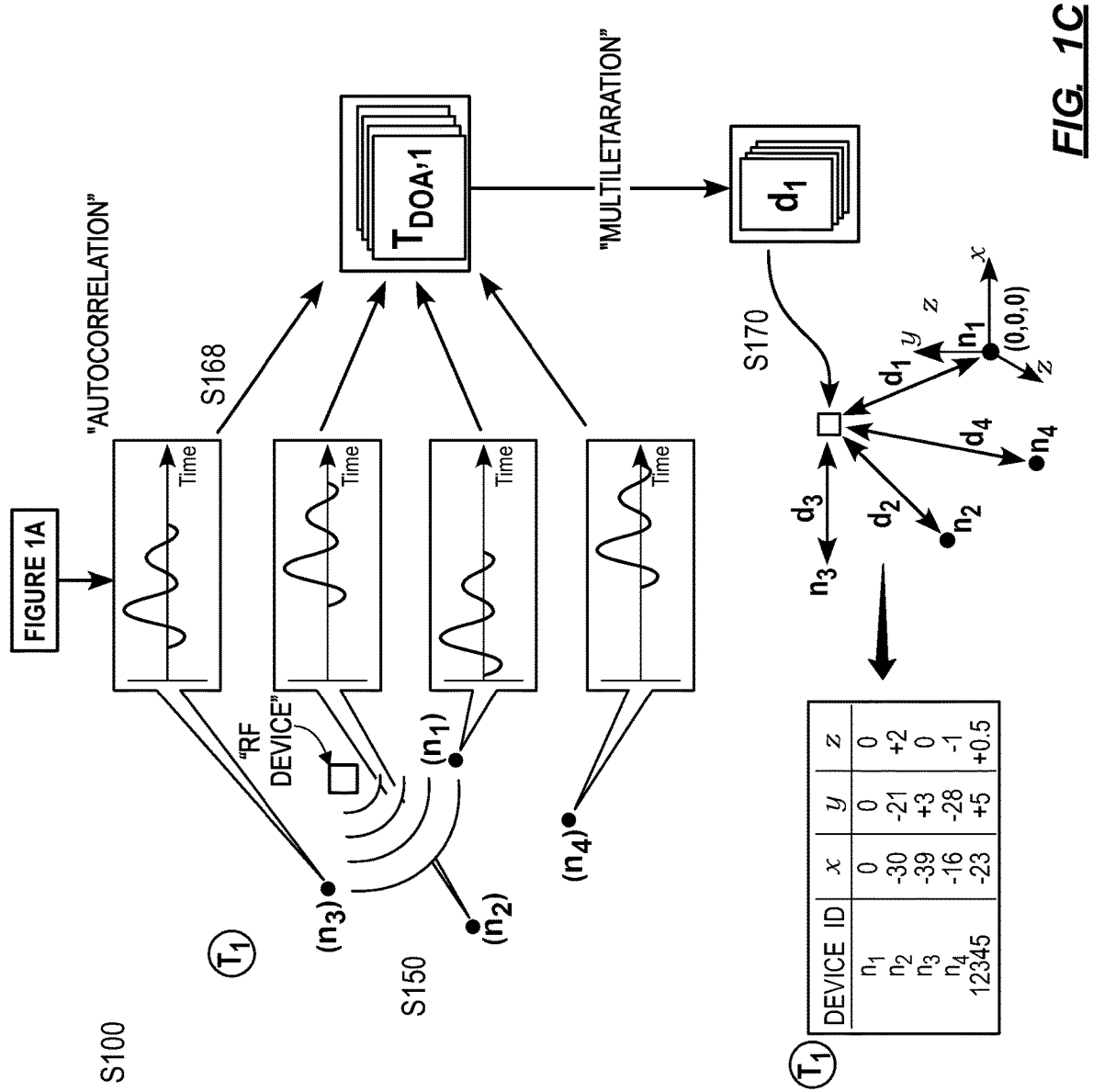

As shown in FIG. 1C, a second variation of the method S100 includes, at each node in a network: transmitting an outbound synchronization signal in Block Silo; generating a self-receive signal based on the outbound synchronization signal in Block S120; detecting the self-receive signal at a self-receive TOA in Block S122; and for each inbound synchronization signal in a set of inbound synchronization signals received from other nodes in the network, detecting a synchronization TOA, in a set of synchronization TOAs, of the inbound synchronization signal in Block S112. The second variation also includes, for each node in the network, based on the self-receive TOA and the set of synchronization TOAs: calculating a time bias of the node relative to one node in the network in Block S142; and calculating a pairwise distance, in a set of pairwise distances, between the node and each other node in the network in Block S132. The second variation further includes: based on the set of pairwise distances, calculating relative locations of nodes in the network in Block S140; at each node in the network, detecting a localization signal, transmitted by a device in Block S150; for each node in the network, calculating a TDOA for the node based on the localization signal detected at each node in Block S168; and calculating a location of the device relative to the network based on the relative locations of nodes in the network and, for each node in the network, the TDOA of the node, and the time bias of the node in Block S170.

2. Applications

Generally, the method S100 is executed by a system including a network (e.g., a mesh network) of nodes and/or remote servers in order to estimate locations of radiofrequency (hereinafter "RF") transmitting devices relative to the network of nodes, such as to within 30 centimeters. The system can estimate the location of (or "localize") a RF transmitting device within RF range of the network of nodes without prior information regarding the position of the nodes, without a requirement that nodes in the network be stationary, without precise calibration (e.g., temporal, gain, and/or frequency calibration) of the nodes, and with each node including a standard electronic clock (e.g., a crystal oscillator clock). Each node in the network can include networking hardware, such as an antenna, transceiver hardware, an FPGA/DPS, a clock, and self-receive signal generator (e.g., an impedance mismatched directional coupler, RF power splitters, combiners, circulators, etc.) further described below.

The system can execute Blocks of the method S100 to localize an RF transmitting device that is detectable by nodes in the network (e.g., at least three nodes for two-dimensional localization, at least four nodes for three-dimensional localization). More specifically, the system can identify and localize third-party devices—such as RFID-, ZIGBEE-, BLUETOOTH-, WIFI-, AND/OR LTE-enabled devices—without necessitating changes to the transmission protocols executed by these devices. Additionally or alternatively, the system can localize specifically designed devices (e.g., active tags) configured to transmit specific localization signals to the nodes in the network.

In order to obtain sub-meter localization accuracy, the system executes a calibration and synchronization process to obtain nanosecond level clock synchronization between nodes in the network by identifying the time offset between each unique pair of nodes in the network. The system can then calculate the relative time bias of the nodes in the network and can compensate for the calculated time biases. By executing the calibration and synchronization processes, the system can also calculate the propagation delay, and therefore the distance between each unique pair of nodes in the network. Once the system has calculated the distance between nodes, the system can establish the relative location of each node in the network given enough total nodes (e.g., at least five nodes for three-dimensional relative location). Thus, if the global location of one of the nodes is known, the system can determine the global location for all other nodes in the network.

The system can then leverage the calculated location information and time synchronization of each node in the network to precisely localize any RF transmitting devices within RF range of the network. The system can uniquely identify an RF transmission (e.g., in the form of a carrier wave) from a device as the RF transmission is received at each node in the network. In one implementation, each node can precisely calculate the TOA of the RF transmission as it propagates to each node. The system can then compare the TOA from each node in the network to calculate a TDOA of the received signal between each node. Alternatively, the nodes can transmit a portion of the received signal to a remote server and/or one of the nodes in the network (e.g., a master node) and determine a TDOA of the received signal via cross-correlation of received signals. The system can then execute a multilateration calculation to estimate the location of the device.

The system can also resolve superposed repetitions of an RF transmission from a device caused by multipath propagation of the RF transmission. After resolving the individual multipath signals the system can individually determine the TOA or TDOA of each multipath signal and then select the LOS TOA or TDOA representing the LOS RF transmission between the device and each node. By eliminating multipath artifacts in the RF transmission, the system can better localize devices in complex propagation environments. The system can execute the aforementioned multipath detection and rejection by utilizing frequency, time, phase, space, and/or orientation diversity, which can be applied at the transmitting end (e.g., by specifying, via a custom protocol, the RF transmissions of devices), the receiving end (e.g., via specialized reception and processing at each node), and/or on the backend (e.g., in post-processing at a master node and/or a remote server).

A system executing Blocks of the method S100 can be deployed for a wide variety of applications. In one example, the system is locally deployed within a warehouse, shop, medical facility, and/or any other building. The network of nodes of the system can be deployed locally around the building such that asset tracking RF tags (active tags), mobile phones, BLUETOOTH, WIFI devices etc. can be localized and tracked within the building. In another example, the system can be deployed as a telecommunication network, wherein each node in the network is a cellular site that can localize, send, and receive signals from cellular devices. In yet another example, the system can be deployed as a network of low-earth-orbit (hereinafter "LEO") satellites, which can localize RF transmissions from large volumes of space on or above earth's surface.

3. System

The system executing the method S100 can include a network (e.g., a mesh network) of nodes, a remote server, and/or active tags or controllable devices (i.e. non-third-party) devices. The nodes in the network are RF transceivers that execute Blocks of the method S100 that involve transmitting or receiving signals between nodes or from a device. Generally, Blocks of the method S100 that do not involve receiving or transmitting signals can be performed on a node and/or a remote server that can execute Blocks of the method S100 via an internet connection (i.e. "in the cloud") with the nodes in order to reduce processing load at the nodes. Furthermore, the system can include various devices that are configured to interact with the nodes in order to be localized by the signals. These "controllable devices" can include a smartphone or other transmitter configured to transmit specific localization signals such that the device can be more easily detected and localized by the system.

3.1 Nodes

Figure 2A:
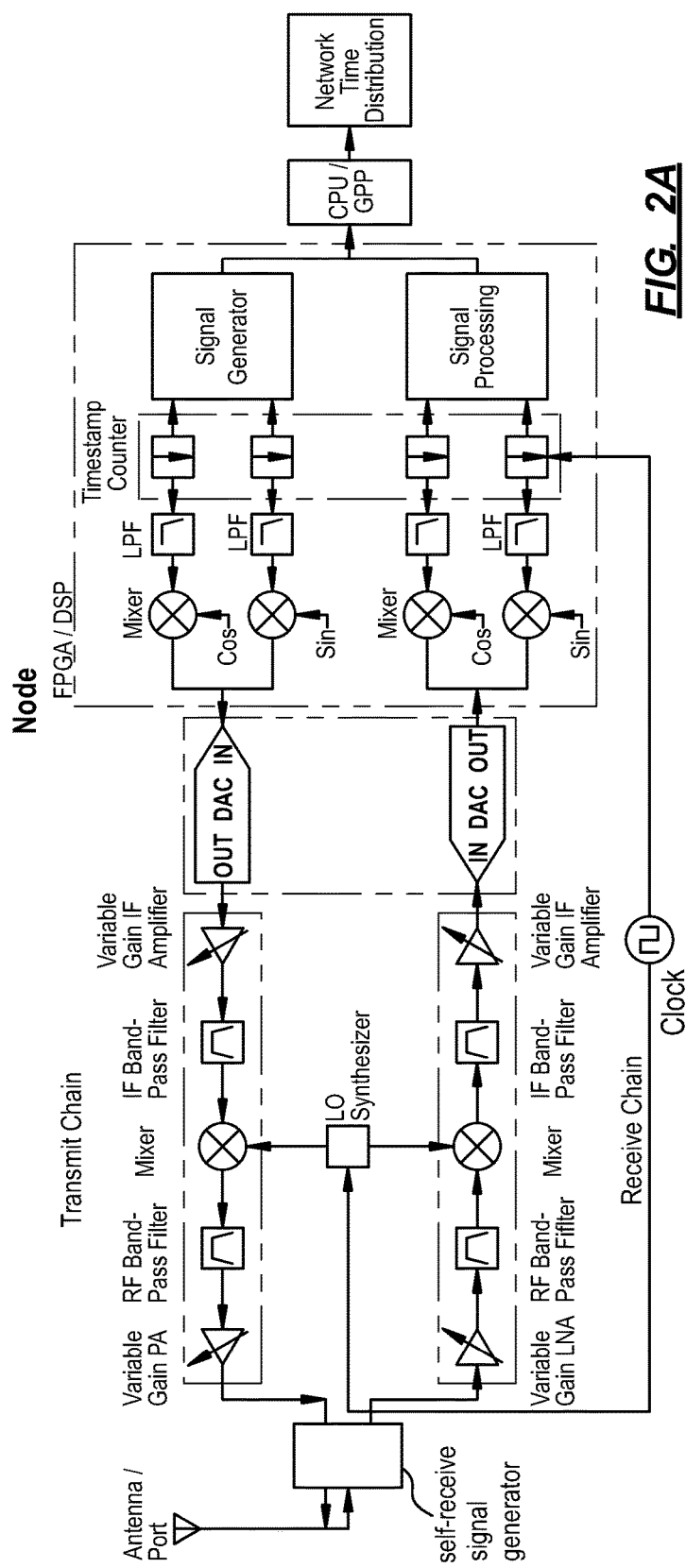
FIGS. 2A and 2B are schematic representations of an apparatus.
Figure 2B:
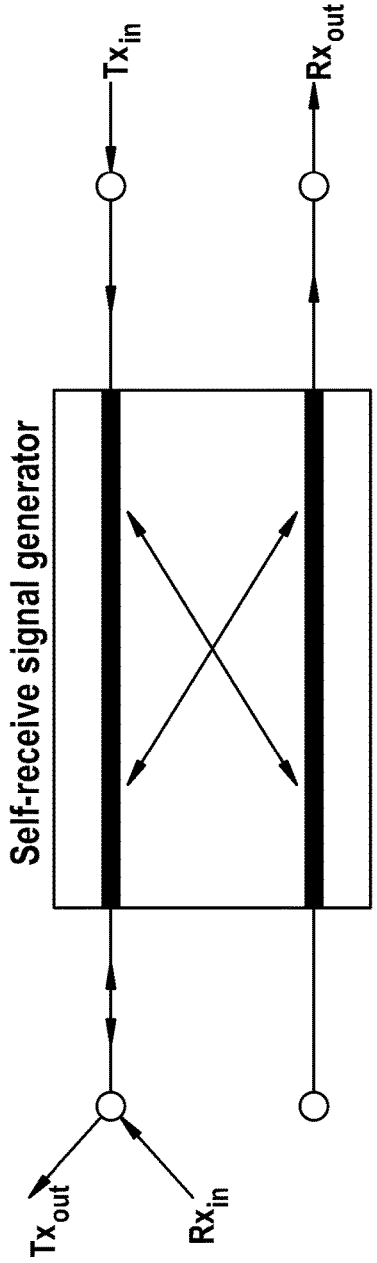

As shown in FIGS. 2A and 2B, the system includes a network of nodes. The network can include two or more nodes, although the more nodes that are included in a network the greater the accuracy of the localization of both the nodes and the devices within RF range of the network of nodes. In one implementation, the network includes three nodes and can localize a device in two-dimensional space. Alternatively, the network includes four nodes and can localize a device in three-dimensional space. In yet another implementation, the network includes five nodes and can localize each node based on the propagation time measured from each of the other four nodes in the network. Thus, the functionality of the system improves upon the inclusion of a greater number of nodes in the system.

Generally, nodes include transmission components and receiver components, an FPGA or DSP configured to generate and process signals, a clock, and a self-receive signal generator. The nodes transmit and receive information wirelessly and as such include RF transceiver hardware such as a super heterodyne radio architecture and an Rx/Tx antenna shown in FIG. 2A. In this implementation, each node includes a "receive chain" and a "transmit chain." The receive chain includes a pipeline of hardware components that process signals received from the Rx port. The transmit chain includes a pipeline of hardware components that process transmission signals generated by the FPGA or DSP and feed them into the Tx port. The receive chain and the transmit chain impart a "receive chain delay" and a "transmit chain delay" respectively. "Receive chain delay" and "transmit chain delay" describe the amount of time elapsed as a signal traverses either the receive chain or the transmit chain respectively.

In one implementation, the nodes can also communicate with a remote server over a wired network. In this implementation, the nodes can include an I/O port and/or appropriate interface converters for communicating over any wired medium (e.g. ethernet, fiber optic, etc.).

In one implementation, a node is integrated within extant transceiver infrastructure such as a cellular site that has been adapted to execute the method S100. A cellular site/tower or other extant transceiver can be adapted to execute the method S100 by updating the software of the cellular site. In alternate implementations, the nodes can include optimized hardware to improve aspects of the method S100.

In one implementation, the FPGA or DSP of each node is configured to generate complex digital signals and output the generated signals to a DAC. The complex components of the digital signals represent the in-phase and quadrature portions (i.e. I/Q) of the analog signal to be generated by the DAC. Additionally, the FPGA or DSP of the node receives digital signals from the antenna of the node via an ADC and timestamps received synchronization signals according to an instant value of the clock and a TOA calculation process described below.

Each node also includes a clock, such as a crystal oscillator clock or an atomic clock, which may be responsible for time-keeping and timestamping functions at the node. The system can execute the method S100 to synchronize clocks across multiple nodes within a network in order to localize devices. In particular, the system can effectively synchronize crystal oscillator clocks that satisfy basic frequency stability, phase noise, and frequency requirements for wireless communication. In one example, the clock is a quartz crystal oscillator with an AT cut and a clock frequency of ten megahertz. However, a node can include a crystal oscillator of any frequency or cut assuming the aforementioned constraints are met.

Each node includes a self-receive signal generator 110, which generates a self-receive signal in Block S120. Generally, the self-receive signal generator feeds an attenuated repetition of the synchronization signal being transmitted to another node back into the receiving port of the sending node. By processing the transmitted synchronization signal via the receive chain and determining a TOA for the self-receive signal, each node is able to timestamp transmitted signals delayed by the receive chain delay (i.e. the time delay incurred by a signal as the signal is processed by the receive chain). When the node later receives a synchronization signal from another node, the TOA of the synchronization signal will also have the same receive chain delay. Because the TOA of the self-receive signal and the TOA of the synchronization signal both include the receive chain delay they can be directly compared without precise calibration of the receive chain hardware.

In one implementation, the self-receive signal generator is an impedance mismatched directional coupler shown in FIG. 2B. The self-receive signal generator can also include a variable impedance circuit, which may be software controlled to vary the gain of the reflected Tx signal into the Rx port. Depending on the specific hardware implementation of the node, similar impedance matching can be applied to circulators, power splitters, or any other transmission line device. However, the self-receive signal generator can include any software or hardware system for feeding a Tx signal into the Rx port.

In one implementation, each node can include a software-defined radio architecture performing the function of any of the hardware elements described above.

3.2 Devices

The system executes the method S100 in order to localize devices. Generally, devices can fall into two categories: controllable devices, and third-party devices. Although, the system can localize either category of controllable device 106, the system can include specific optimizations that can improve localization of controllable devices. More specifically, controllable devices can include any device manufactured and/or configured (e.g., via firmware or software) to transmit specific RF signals (i.e. localization signals) that can be detected by the nodes in the network. In one implementation, controllable devices include "active tags," which can be low-power RF transceivers configured for an asset tracking application. In another implementation, controllable devices can include smartphones or any other device executing a software or firmware application that transmits localization signals to be detected by nodes in the network. In yet another implementation, the controllable devices include low power transmitters that cannot receive signals from the system and operate according to a pre-defined custom transmission protocol.

Third-party devices can include any device that produces RF transmissions at a sufficiently high power to be received at nodes in the network. Generally, third-party devices communicate wirelessly by executing standardized wireless protocols, such as BLUETOOTH, WIFI, LTE, and/or any other wireless protocol that can be detected via a node-executing packet analysis techniques. Although, the third-party devices may not transmit localization signals as defined by the system, any identifiable RF transmission can be considered a localization signal for a third-party device. For example, the system can detect a periodic LTE synchronization sequence received from a particular device as a localization signal for that device.

However, the system can localize any RF-emitting device that can be detected at a sufficient number of nodes in the network.

4. Frame and Slot Definition

Generally, the system executes a slot and frame TDMA structure in order to communicate between nodes, receive localization signals and other RF transmissions from devices, and/or to communicate wirelessly with internet access points. The TDMA frame structure can include one or more slots for frequency calibration between nodes, time synchronization and localization between nodes, for localization of devices, and/or for other data transfer.

In one implementation, a TDMA frame can include a synchronization slot to synchronize each unique pair of nodes in the network (each unique combination of two nodes in the network). For example, a network including three nodes, $n_1$, $n_2$, and $n_3$, would include a first synchronization slot for the synchronization of $n_1$ and $n_2$; a second synchronization slot for $n_1$ and $n_3$; and a third synchronization slot for $n_2$ and $n_3$. Alternatively, the TDMA frame can include a synchronization slot for each node in the mesh network to transmit a synchronization signal to all other nodes in the mesh network. For example, in a mesh network including three nodes, $n_1$, $n_2$, and $n_3$, would include a first synchronization slot for $n_1$ to transmit a synchronization signal to $n_2$ and $n_3$; a second synchronization slot for $n_2$ to transmit a synchronization signal to $n_1$ and $n_3$; and a third synchronization slot for $n_3$ to transmit a synchronization signal to $n_1$ and $n_2$.

In one implementation, (e.g., if an initial synchronization accuracy achieved with a network time protocol is sufficiently low), each synchronization slot is further divided into two subsequent sub-slots to reduce synchronization overhead. For example, in a synchronization for n1 and n2, n1 transmits during the first sub-slot and n2 receives the transmission from n1. Then, in a second sub-slot, n2 transmits and n1 receives.

In one implementation, a TDMA frame can also include a calibration slot during which the system can calibrate for frequency offsets between the clocks of nodes in the network. In another implementation, a TDMA frame can include multiple calibration slots within the same frame. Additionally, the TDMA frame can include a separate set of calibration slots in a TDMA frame for each unique pair of nodes in the network, which can be structured in a similar manner to the synchronization slots described above. The timing of the calibration slots in each TDMA frame is determined by the calibration process further described below.

The TDMA frame can also include localization slots during which the nodes receive localization signals from devices according to standardized wireless protocols or custom protocols executed by controllable devices. In one implementation, the duration and timing of localization slots correspond to the wireless protocols supported by the system. For example, if the system is configured to localize BLUETOOTH, WIFI, and LTE devices, the TDMA frame can include localization slots that align with particular BLUETOOTH, WIFI, and LTE slots. The localization slots can also include "sniffing" or network analysis slots in order to detect the presence of devices transmitting according to various standardized protocols.

Each TDMA frame can also include a header slot indicating to other nodes the presence and order of calibration slots, synchronization slots, localization slots, and data transfer slots for each node in the network. The duration and/or frequency of calibration slots, synchronization slots, localization slots, and the buffer time between any two slots can vary depending on the implementation and within an implementation. For example, the duration of calibration slots can vary depending on the initial or current frequency offset between nodes. The duration of synchronization slots can depend on factors such as the current known time bias between nodes, the predicted drift rate of each unique pair of nodes and associated uncertainty. Furthermore, the duration of localization slots can depend on the expected drift rate of the device clocks.

The system can adjust slot duration based on the output of a predictive drift model. In one implementation, the system can apply the predictive drift model to both nodes in the network and devices being localized. The predictive drift model can take as input any available information regarding the clock of a device or node, as well as any environmental data (e.g., temperature and/or inertial measurement unit data) from the device or node to predict the rate of drift in the clock of any device or node. The system can also incorporate any historical drift of the device or node into the predictive drift model.

Furthermore, the synchronization slot duration can have a lower limit equal to a sum of the uncertainty in the time bias between the pair of nodes, the propagation time between the pair of nodes, the uncertainty of the propagation time between the pair of nodes, and the duration of the synchronization signal, of which the duration of the synchronization signal is typically the most significant factor. In one implementation the slot and the buffer between synchronization slots are both set to one millisecond. Additionally or alternatively, the method S100 can include adjusting the synchronization slot duration as a function of the signal-to-noise ratio of previously received synchronization signals in order to provide additional measurement acquisition time to determine TOA of signals with lower signal-to-noise ratios.

Additionally, the duration of each TDMA frame is subject to a set of practical constraints. The TDMA frame duration can have an upper limit defined by the expected drift of the least stable node clock in the node pair compared to the desired accuracy of the clock synchronization process. For example, if one node clock is known to drift one nanosecond per second due to accumulated jitter and the desired accuracy of the clock synchronization process is one nanosecond, the TDMA frame duration (or time between synchronization slots) would be limited at one second such that the time bias between nodes is not likely to exceed one nanosecond.

Furthermore, the TDMA frame duration has a lower limit based on the sum of the expected initial clock offset between the nodes, the total duration of the synchronization slots, the total duration of any data transfer slots, and the total duration of any time buffers between slots. The frame duration must be sufficiently long for each node to receive the initial synchronization signal from each of the other nodes in the network while accounting for a large initial time bias. Thus, if the nodes are initially synchronized using NTP, the frame duration should be at least tens of milliseconds to account for time biases that are typical between NTP synchronized clocks.

5. Node Frequency Calibration

Generally, the system executes a clock frequency calibration process between each unique pair of nodes in the network. The frequency calibration process enables the system to subsequently compensate for frequency offsets between the clocks in each unique pair of nodes in the network. The system executes the frequency calibration process before the time synchronization process such that the frequency offset between the pair of nodes can be characterized before the time domain drift between the two clocks is detected and compensated for in the synchronization process.

More specifically, the system detects and compensates for frequency offsets between two crystal oscillator clocks or a crystal oscillator clock and an atomic clock between a pair of nodes. Typical frequency offsets for crystal oscillators range from a few hundred parts-per-billion (hereinafter "ppb") to a few hundred parts-per-million (hereinafter "ppm"). When compared to typical levels of time domain drift, frequency offset drift is oftentimes more significant. As such, the system compensates for the frequency offset between the clocks of two nodes. Additionally, without compensating for clock frequency offset, TOA calculation for synchronization signals may be less accurate. Thus, the system can execute the frequency calibration process in conjunction with the time synchronization in order to achieve nanosecond level time synchronization between nodes and, as a result, improved localization capabilities for devices within range of the network of nodes.

A node in the network transmits successive calibration signals separated by a calibration signal interval (hereinafter "signal interval"). In one implementation, the calibration signals are pseudorandom sequences. The system can transmit the calibration signals successively during a calibration slot in the TDMA frame. Additionally, the system can transmit each successive calibration signal delayed by a signal interval, which is measured by the clock of the transmitting node.

For example, if the signal interval is one second, the transmitting node begins transmitting the first calibration signal one second before the transmitting node begins transmitting the second calibration signal. The duration of the signal interval can be adaptive based on a predicted initial offset between the clocks of a pair of nodes and a nominal initial clock frequency of each node. Meanwhile, a receiving node in the pair of nodes receives each successive calibration signal and determines the TOA of each calibration signal to within one sampling period (e.g. based on the sample time counter of the clock). For example, if the sampling frequency of a node clock is ten megahertz, the TOA can be determined to within the sampling period of nanoseconds. The system can then calculate the time elapsed between the calibration signals according to the clock of the receiving node and calculate a difference between the elapsed time and the signal interval. The system then records the calculated difference as a signal interval deviation, which the nodes and/or remote server can then leverage to determine a frequency offset between clocks in the nodes.

Furthermore, the difference between the measured signal interval at the receiving node (assuming both signals had the same transmission path length) and the signal interval at the transmitting node may not be entirely attributable to the frequency offset between the clock of the receiving node and the clock of the transmitting node. Differences in measured duration of the signal interval between the transmitting node and the receiving node may be a function of: frequency domain drift due to the frequency offset between clocks in the nodes; time domain drift due to phase noise accumulation during the signal interval; and/or time domain drift due to changing environmental factors during the signal interval. Also, because the clock of the receiving node and the clock of the transmitting node may operate at different frequencies, the accuracy of the TOA of each calibration signal—such as calculated by the receiving node—may be reduced to within one sampling period (e.g. to within nanoseconds for a clock with a sampling frequency of ten megahertz). Therefore, the system can include measuring multiple successive signal intervals and calculating a frequency offset between clocks of the transmit and receive nodes based on a combination of signal interval deviations recorded over time.

In one example of the above described implementation, nodes in the network transmit calibration signals one second apart until a deviation of one sampling period (100 nanoseconds, for a ten megahertz clock) is detected in one signal interval by the receiving node. If, for example, a deviation of one sampling period is detected for the fifth signal interval (i.e. after the receiving node receives the sixth calibration signal) then the frequency drift is calculated by dividing nanoseconds by five seconds resulting in a calculated drift of 20 ppb and an equivalent frequency offset of 0.2 Hertz between the transmitting node and the receiving node.

In one implementation, the system executes the frequency calibration process after calculating a first sampling period deviation in order to calculate additional sampling period deviations (hereinafter "deviations") and combines these deviations to derive the frequency offset between clocks in the nodes with greater resolution and accuracy, such as by averaging deviations calculated over many signal intervals.

After the system calculates the frequency offset, the system can apply frequency compensation equal to the frequency offset (e.g. the slave node to bring the slave node into frequency calibration with a master node). In one implementation, the system executes the frequency calibration process on a pairwise basis across a network of nodes calibrating the frequency of each node clock based on the clock frequency of a master node. Alternatively, a master node can transmit the successive calibration signals to multiple nodes in the network at the same time and each of the receiving nodes can be calibrated to the master node concurrently.

More specifically, the system executes the frequency calibration process by: receiving, at a receiving node, the set of calibration signals transmitted by a transmitting node; calculating TOAs for the set of calibration signals received; calculating a frequency offset based on the set of TOAs for the received calibration signals; subtracting each TOA from the subsequent TOA to determine a received signal interval between each of the received signals; subtracting each received signal interval in a set of received signal intervals from a corresponding set of transmitted signal intervals, as measured according to the clock of the transmitting node, to calculate a deviation for each received signal interval as compared to the transmitted signal interval; and averaging the deviations to determine an average error. The system then multiplies the average error ratio by the sampling frequency to obtain the frequency offset between the transmitting node and the receiving node. Thus the process for calculating the frequency offset between a transmitting node and a receiving node is expressed as follows:

$$f_r - f_t \approx f_t \sum_{i=1}^{n} \frac{s_{r,i} - s_{t,i}}{s_{t,i}},$$

where $f_r$ is the clock frequency of the receiving node, $f_t$ is the clock frequency of the transmitting node, n is the number of calibration signals received, $s_{r,i}$ is the signal interval in samples-per-second according to the clock of the receiving node, and $s_{t,i}$ is the signal interval in samples-per-second according to the clock of the transmitting node.

In one implementation, statistical techniques are applied to the set of deviations $s_{r,i}-s_{t,i}$ to remove outliers and/or detect frequency drift during the calibration period. For example, the system can plot residuals of the average deviation against time to determine if there are any trends in the set of deviations over the measurement interval.

Furthermore, the transmitting node or the receiving node can compensate for the measured frequency offset. Compensation can occur by correcting the timestamp for one of the clocks periodically to cancel out the frequency offset induced drift.

6. Node Time Synchronization and Pairwise Distance Calculation

In Blocks S110, S112, S120, S122, S130, S132, S140, S142, each unique pair of nodes in a mesh network calculates a time bias and a propagation delay between the pair of nodes in order to synchronize clocks of the pair of nodes relative to each other and to determine the distance between the pair of nodes. In executing the calibration process the system can, at each node in each unique pair of nodes in the network: transmit an outbound synchronization signal; generate a self-receive signal based on the outbound synchronization signal; detect the self-receive signal at a self-receive TOA, in a pair of self-receive TOAs; and detect an inbound synchronization signal, transmitted from an opposing node in the unique pair of nodes, at a synchronization TOA, in a pair of synchronization TOAs. Additionally, the system can, based on the pair of self-receive TOAs and the pair of synchronization TOAs and for each pair of nodes in the network: calculate a pairwise time offset, in a set of pairwise time offsets, between the unique pair of nodes; and calculate a pairwise distance, in a set of pairwise distances, between the unique pair of nodes. Furthermore, the system can, for each node in the network: based on the set of pairwise distances, calculate a relative location of the node in the network relative to one node in the network; and based on the set of pairwise time offsets, calculate a time bias of the node in the network relative to one node in the network.

Generally, each node (in a unique pair of nodes in the network) generates a synchronization signal; concurrently transmits the synchronization signal to the other node while receiving a self-receive signal based on the transmitted synchronization signal; and receives a synchronization signal from the other node in the node pair. For ease of description, the nodes in a node pair will be referred to as $n$ and $n_2$. However, $n$ and $n_2$ can refer to any two-node pair in a mesh network. The system calculates the relative time bias between $n_1$ and $n_2$ represented as $(b_1-b_2)$ and the propagation delay $\tau$. Based on the reciprocity theorem of electromagnetism, the propagation delay for a signal transmitted from $n_1$ to $n_2$ is equal to the propagation delay for a signal transmitted from $n_2$ to $n_1$ ($\tau_{1,2}=\tau_{2,1}\equiv\tau$).

In calculating TOA, the receiving node can cross-correlate a received synchronization signal or self-receive signal with a template signal to determine a timestamp corresponding to the peak value of the autocorrelation function. Synchronization signals can include specifically chosen sequences that have a high autocorrelation value when the sequences are aligned and a low autocorrelation value otherwise. In one implementation, each node performs digital autocorrelation between received signals and template signals. Alternatively, each node performs analog autocorrelation between an analog conversion of the digital synchronization signal and the template signal. The latter accounts for the time durations between samples in addition to the value of the samples.

In Block S110, at local time $T_1$, $n_1$ generates a digital synchronization signal at the FPGA or DSP. In one implementation, $n_1$ converts the digital synchronization signal to an analog synchronization signal for transmission via the antenna and propagates the converted synchronization signal along the transmit chain of $n_1$, thereby incurring a transmit chain delay, $t_1$. The analog signal then interacts with the self-receive signal generator, which reflects or otherwise redirects the synchronization signal into the Rx port of $n_1$ as shown in Block S120. The reflected or otherwise redirected synchronization signal is substantially similar to the synchronization signal though the gain of the two signals may differ.

In Block S122, $n_1$ receives the self-receive signal as it is transmitting the synchronization signal. While the self-receive signal propagates through the receive chain of $n_1$ it incurs receive chain delay, $r_1$. $n_1$ then calculates a local TOA of its self-receive signal, $S_{1,1}$, which is related to the unknown parameters of interest via the following equation:

$$S_{1,1}=T_1+t_1+r_1$$

Thus, $S_{1,1}$ represents the TOA of the self-receive signal from $n_1$ according to the clock of $n_1$.

As the second node in the unique pair of nodes $n_2$ executes the equivalent steps to those executed by $n_1$ in Blocks S110, S120, and S122, thereby transmitting a second synchronization signal and calculating a TOA of the self-receive signal generated by $n_2$:

$$S_{2,2}=T_2+t_2+r_2$$

Thus, $S_{2,2}$ represents the measured TOA of the self-receive signal from $n_2$ according to the clock of $n_2$.

In Block S112, $n_1$ receives the synchronization signal from $n_2$ (the second synchronization signal), which propagates through the receive chain of $n_1$ incurring receive chain delay, $r_i$. $n_1$ then calculates a local TOA for the synchronization signal received from $n_2$, $S_{1,2}$, which is expressed in the following equation:

$$S_{1,2}=T_2-b_2+t_2+\tau+r_1+b_1$$

Thus, $S_{1,2}$ represents the measured TOA of the synchronization signal from $n_2$ according to the clock of $n_1$.

As the second node in the unique pair of nodes $n_2$ executes the equivalent steps to those executed by $n_1$ in Block S112, thereby receiving a synchronization signal from $n_1$ (the first synchronization signal) and calculating a local TOA for the synchronization signal, $S_{2,1}$, expressed as follows:

$$S_{2,1}=T_1-b_1+t_1+\tau+r_2+b_2$$

Thus, $S_{2,1}$ represents the measured TOA of the synchronization signal from $n_1$ according to the clock of $n_2$.

One of the nodes, either $n_1$ or $n_2$, or another computational device such as a server, collects the above TOAs, $S_{1,1}$, $S_{1,2}$, $S_{2,2}$, and $S_{2,1}$, to calculate $\tau$ and $b_1-b_2+r_1-r_2$, or the relative time bias plus the difference in receiver chain delay. Taking differences between the self-receive signal and the corresponding synchronization signal received at opposite nodes:

$$S_{1,2}-S_{2,2}=\tau+r_1+b_1-r_2-b_2$$

$$S_{2,1}-S_{1,1}=\tau+r_2+b_2-r_1-b_1$$

Thus, in Blocks S130 and S132 the system calculates as:

$$\tau = \frac{1}{2}[(S_{1,2}-S_{2,2})+(S_{2,1}-S_{1,1})]$$

and $b_1-b_2+r_1-r_2$ as:

$$b_1-b_2+r_1-r_2 = \frac{1}{2}[(S_{1,2}-S_{2,2})-(S_{2,1}-S_{1,1})]$$

Although a value for the pure relative time bias, $b_1-b_2$, cannot be calculated without the value of $r_1-r_2$, adjusting the clock of one node in the pair of nodes by $b_1-b_2+r_1-r_2$ ensures that any signal received by both nodes at the same time will receive the same timestamp at each node even if the instantaneous time at each clock differs by $r_1-r_2$ because the difference in receive chain delay will compensate for the post adjustment time bias. Alternatively, if $r_1-r_2 \cong 0$, then:

$$b_1-b_2 \cong \frac{1}{2}[(S_{1,2}-S_{2,2})-(S_{2,1}-S_{1,1})]$$

Once the system calculates (i.e. the propagation delay between $n_1$ and $n_2$), the system can then calculate the pairwise distance between $n_1$ or $n_2$, $d_{1,2}$, by multiplying $\tau$ by c, which is the propagation speed of the synchronization signal (e.g., the speed of light in the relevant medium). Thus, the system can calculate the pairwise distance between the two nodes, in Block S132.

Once $d_{1,2}$ and $b_1-b_2+r_1-r_2$ have been calculated, the method S100 can also include synchronizing the time between $n_1$ and $n_2$ by adding $b_1-b_2+r_1-r_2$ to the clock of $n_1$ or $n_2$ to compensate for the initial time bias. In implementations with multiple nodes in the mesh network, one node is designated as a "master node" while the other nodes are designated "slave nodes." Thus, in this implementation, the method S100 includes adjusting the clocks of the slave nodes to match the master node. Thus, in Block S142, the system can, based on the set of pairwise time offsets, calculate a time bias of the node in the network relative to one node in the network.

In one implementation, each node in the mesh network can average measurements to calculate a time bias and propagation delay when these variables are over-defined. For example, in a network including nodes $n_1$, $n_2$, and $n_3$, the time bias between $n_1$ and $n_2$ can also be calculated as follows:

$$b_1 - b_2 \cong \frac{1}{2}[(S_{1,3} - S_{3,3}) - (S_{3,1} - S_{1,1})] - \frac{1}{2}[(S_{2,3} - S_{3,3}) - (S_{3,2} - S_{2,2})]$$

Additionally, the method S100 can include incorporating carrier phase information from the synchronization signals, which can improve the calculation of τ. For example, when the carrier frequency of a synchronization signal is equal to the carrier frequency of the self-received signal, this method consists of using the phases at times $t_1$, $t_1+\tau$, $t_2$, $t_2+\tau$ related by:

$$p_{i,j,t_k} = \begin{cases} p_{i,t_k} + 2\pi\tau f_{lo} + p_{j,t_k+\tau}, & i \neq j \\ 2p_{i,t_k}, & \text{otherwise} \end{cases}$$

where $P_{i,j,t_k}$ is the phase between nodes i and j, $P_{i,t_k}$ is the carrier phase at node i at time $t_k$. Note that the left-hand side is measurable and corresponds to the carrier phases at the amplitude peaks. Here is the unknown propagation time. For each $f_{lo}$ out of values in a set, one can compute:

$$8\pi\tau f_{lo} = p_{1,2,t_1+\tau} - p_{1,1,t_1} + P_{2,1,t_2+\tau} - p_{2,2,t_2}$$

Once several measurements are obtained for a range of carrier frequencies, $f_{lo}$, the above set of equations can be solved to give the propagation time τ.

Furthermore, the method S100 can include calculating an instantaneous uncertainty in the relative time bias between nodes, $\Delta(b_1-b_2)$ and an instantaneous uncertainty in the propagation delay Δτ. Sources of uncertainty can include the calculation of TOAs at each node and any expected drift that may occur between the two clocks between synchronization slots.

6.1 Relative Localization of Nodes in the Network

Generally, in Block S140, the system can calculate the relative location of each node in the network based on the pairwise distance between each unique pair of nodes in the network. Furthermore, the system can calculate a global location of each node in the network given a global location of one node in the network and locations of the other nodes in the network relative to the one node. More specifically, a system including at least five nodes can calculate the relative three-dimensional location of each node in the network based on pairwise distances between each node in the network. Similarly, a system that includes four nodes can calculate the relative two-dimensional location of each node in the network based on the pairwise distance between each node. In one implementation, the system includes greater than five nodes and improves the accuracy of the relative location calculations via measurement redundancy/overdetermination.

The system can determine the relative location of each node in the network by defining an origin of a coordinate system at one node and an axis of the coordinate system through one other node in the network. Alternatively, the system can define the coordinate system such that one node is located at the origin and two other nodes are located on a two-dimensional plane. The system can then solve a set of self-consistency equations for the pairwise distances in the network. The self-consistency equations are of the following form:

$$(x_i-x_j)^2+(y_i-y_j)^2+(z_i-z_j)_2 = d_{i,j}^2$$

for each unique pair of nodes $n_i$ and $n_j$ in a network of nodes. The system can solve the self-consistency equations via iterative or stochastic methods because the system of self-consistency equations cannot be solved deterministically given the error in the calculation of the pairwise distances between nodes and/or, in some circumstances, the overdetermination of the system of self-consistency equations. Additionally, the system can incorporate any additional positional information to further constrain the system of self-consistency equations and improve the calculation of the location of each node in the network.

However, the system can implement any mathematical technique to convert the set of pairwise distances between nodes in the network to a relative location of each node in the network.

7. Device Localization

Generally, the system executes a combination of Blocks S150, S152, S154, S156, S158, S160, S162, S164, S166, S168 and/or S170 to localize devices within RF reception range of a sufficient number of nodes in the network. More specifically, the system can receive signals in the form of carrier waves in Block S152; disambiguate signals from multiple devices in a crowded wireless environment; uniquely identify a device based on a disambiguated signal in Block S154; calculate a set of TDOAs of a signal from the device between nodes in the network; and perform TDOA multilateration to localize the device in Block S158. Additionally, the system can also detect multipath artifacts of the signal from the device and select a LOS signal from the set of multipath signals. Furthermore, the system can perform statistical denoising and TDOA bounding to improve localization accuracy.

7.1 Signal Disambiguation

In order to disambiguate specific signals from each other and general RF noise, the nodes execute one or more wireless protocols to detect devices also communicating via those protocols. The system can execute variations of standardized wireless protocols including various versions of ZIGBEE, BLUETOOTH, WIFI, GSM, CDMA and LTE protocols or any other standard wireless communication protocol. Additionally, the system can execute custom wireless protocols specifically designed for localization of devices via a network of nodes. Both standardized wireless protocols and custom wireless protocols can implement one or more forms of multiple access structure such as TDMA, frequency division multiple access (hereinafter "FDMA"), code division multiple access (hereinafter "CDMA"), or some hybrid or variant thereof. Thus, the system can also implement these multiple access techniques to disambiguate transmissions from different devices. Once a node in the network has accessed a multiplexed channel, the node records samples of a carrier wave transmitted from a device via the receive chain and Rx port of the node. Thus, in Block S154, the node can then demodulate the carrier wave to identify signals transmitted from a device.

The system can localize third-party devices and controllable devices such as active tags. As such, the demodulated signal can include a specific localization signal (e.g., from a controllable device) that is specially configured for calculation of a TOA or TDOA by the system. Additionally, a controllable device can also be configured to transmit an identification signal along with a localization signal such that the system can more easily identify the device and associate the calculated location of the device with previously calculated locations of the device. However, if the demodulated signal is received from a third-party device operating a standardized wireless protocol, then the demodulated signal may not include specific localization signals for calculating TOA or TDOA of the signal. Instead the system can identify and localize the device based on particularly identifiable and localizable transmissions specified by the standardized wireless protocols.

7.2 Custom Protocols

In one implementation, the system localizes a controllable device via a custom wireless communication protocol. A custom wireless communication protocol can: specify the multiple access method utilized to disambiguate signals from different controllable devices; specify the structure of an identification signal used to establish a unique identity of a controllable device; and specify the structure of a localization signal sent from a controllable device such that the system can calculate a TOA or a TDOA of the localization signal at each node in the network. In one implementation, a custom wireless protocol specifies an adjustable wireless protocol such that the system can instruct controllable devices to change the channel (in the multiple access method) and/or the timing, duration, format, or structure of the localization or identification signals of the device.

7.2.1 Localization Signal Structure

Generally, the localization signal for controllable devices includes a pseudorandom sequence that exhibits a high peak autocorrelation when aligned compared to when not aligned. In one implementation, the localization signal is a Zadoff-Chu sequence.

In implementations where the controllable devices are one-way transmitters and cannot receive signals from the system (e.g., certain implementations of active tags), the localization signal can include a single static pseudorandom sequence preassigned to each controllable device. The controllable device can then periodically transmit the preassigned sequence such that the nodes can localize the controllable device.

In an alternative implementation, wherein controllable devices are configured to receive signals from the system, the system can transmit instructions to the controllable device specifying the localization signal for the controllable device to transmit. Additionally, the system can communicate synchronization, timing, or channel information to the controllable device such that the controllable device can transmit at a time and on a channel specified by the system, thereby enabling consistent reception of localization signals from the device by the nodes in the network in a variety of wireless propagation environments.

In another implementation, the controllable devices are configured to transmit localization signals over multiple bands in order to mitigate the effects of multipath fading and improve the probability of detecting and calculating a TOA or a TDOA of the LOS signal for each node in the network. For example, the controllable devices can be configured to transmit a localization signal over multiple carrier frequencies via frequency-division multiplexing (hereinafter "FDM"). Additionally or alternatively, the controllable devices can transmit the localization signal in multiple time-division multiplexed (hereinafter "TDM") slots, thereby improving time diversity in the localization signal.

7.2 Standardized Protocols

In one implementation, the system localizes a third-party device via a standardized wireless communication protocol such as ZIGBEE, BLUETOOTH, WIFI, GSM, CDMA, and/or LTE, etc. Although a standardized wireless protocol may not explicitly specify a localization signal or an identification signal in transmissions between communicating devices, standardized wireless protocols frequently require devices utilizing the protocol to identify the transmitting devices' initial communications and communicate on particular multiplexed channels such that the devices can consistently transmit signals to the correct device. Additionally, many standardized wireless protocols leverage pseudorandom sequences in the protocol for various purposes other than localization.

Thus, the system can execute a TDMA protocol that detects these localizable sequences and can localize devices transmitting via standardized wireless protocols by intercepting transmissions the device would otherwise make during normal operation. For example, the LTE protocol specifies a pseudorandom (Zadoff-Chu) sequence in the physical uplink control channel (PUCCH). The nodes in the network can be configured to detect this sequence and use it as a localization signal for a particular LTE device. Similar methods can be applied to other periodically broadcasted synchronization and control sequences in other standardized wireless protocols. Therefore, the localization signal can include a standardized wireless protocol communication.

7.4 Multiple Protocol Stack

The system can localize devices transmitting according to any of multiple standardized wireless protocols. In one implementation, the system does not implement the full protocol stack of each standardized protocol included in the multiple protocol stack. In this implementation, the system can implement the parts of each standardized protocol for demodulating the physical waveform into symbol or bit streams. Additionally or alternatively, the system can implement parts of standardized protocol stacks relevant to demultiplexing transmissions from multiple devices. For example, the system can demultiplex signals sent by a device transmitting according to a standardized wireless protocol by using control/header frames or by exploiting the time separation of the transmissions. After demultiplexing the received signals, the system can extract metadata such as protocol description and transmission parameters in order to identify and/or localize a device.

7.5 Device Identification and Tracking

The system can also identify and track various localized devices as they move relative to the network. In one implementation, the system can associate a device with an identifier, based on an identifying signal transmitted by the device; and associate subsequently received signals from the device with the identifier. If the device is executing a custom wireless protocol, the protocol can specify a unique and identifiable localization signal or an identification signal such that any transmission made by the device can be identified as having been transmitted from the device. Alternatively, if a device is executing a standardized wireless protocol, the system can implement a multiple access scheme based on each device transmitting identifying information in the process of executing the standardized wireless protocol.

In an alternative implementation, the system can interface with a hub or computational device that is coordinating a standardized wireless protocol (e.g., a master node in a BLUETOOTH piconet or an eNode-B cellular site for LTE) in order to identify the multiplexed channels on which various devices are transmitting. The system can then identify any transmission received on the multiplexed channel at the expected time as having originated at a device specified by the wireless hub or master node.

In yet another implementation, the nodes in the network themselves can execute the standardized wireless protocol and localize devices communicating with the node. For example, the nodes themselves can operate as eNode-B cellular sites and can execute the LTE protocol. Thus, each of the nodes, in the process of operating the LTE protocol, will have information detailing the identity and channel information for each device that is communicating with the node. The system can utilize this information at other nodes in order to localize the device.

Once the system identifies a device, the system can assign an internal identifier to the device and associate any calculated or estimated location information for the device with the identifier, such that location and path of the device can be tracked relative to the nodes in the network.

7.5.1 Adaptive Protocols and Collision Detection

In one implementation, the system can also track and/or predict the clock drift of devices being localized by the system relative to the synchronized clocks of the nodes by identifying transmissions from the device with a device identifier. Generally, the system can characterize a clock drift of the device based on a time difference between localization TOAs of subsequently received signals from the device relative to boundaries of a transmission slot defined by a wireless protocol; and modify the first standardized wireless protocol based on the clock drift of the device. Additionally, the system can estimate, based on the location of the device over multiple of the subsequently received signals, a predicted clock drift of the device; and modify the first standardized wireless protocol based on the predicted clock drift of the device.

Thus the system can anticipate, based on the drift rate of the clock of a device, a time at which the device will no longer be transmitting within the TDMA slot specified by the wireless protocol. In one implementation, the system can adjust the bounds of the TDMA frame to accommodate the drift of the device's clock. Alternatively, if the device is a controllable device, the system can send a synchronization signal to realign the clock of the device with the node clocks. In yet another implementation, the system can instruct a device to transmit via a different carrier frequency such that signals from multiple devices can be interpreted within the same TDMA slot.

However, the system can modify the TDMA frame structure in any way to accommodate collisions an disambiguate collided signals within a single TDMA slot.

8. TDOA Calculation

Generally, in Blocks S166, and S168 the system can, for each node in the network, calculate a TDOA for the node based on the localization signal detected at each node. More specifically, the system can calculate a TDOA of a localization signal directly from the localization signals themselves or by first calculating an accurate TOA at each node (by compensating for the previously calculated time bias of each node) and subtracting the earliest TOA at the first node to receive the signal from each of the TOAs for the other nodes. Thus, the system can, for each node in the network, adjust the localization TOA (i.e. the TOA of a localization signal) at the node, in a set of localization TOAs, by the time bias of the node.

In implementations wherein the system calculates TDOAs for nodes directly based on the received localization signals, each node can transmit timestamped localization signals as received at the node to a master node or remote server. The system can then cross-correlate the localization signals on a pairwise basis to generate a set of TDOAs for the localization signal at each node in the system. In these implementations, the system compensates for systemic offsets (e.g., time bias and frequency offset) between each pair of nodes when calculating the cross-correlation between the localization signals received at each of the nodes.

In an alternative implementation, the system individually calculates TOAs for the localization signal at each node and then subtracts the calculated TOA values to determine a set of TDOA values. In calculating a TOA of a localization signal, the receiving node can auto-correlate the received localization signal with a template localization signal to determine a timestamp corresponding to the peak value of the auto-correlation function. Localization signals can include specifically chosen sequences that have a high autocorrelation value when the sequences are aligned and a low autocorrelation value otherwise. In one implementation, each node performs digital autocorrelation between received signals and template signals. Alternatively, each node performs analog autocorrelation between an analog conversion of the digital synchronization signal and the template signal. The latter accounts for time durations between samples in addition to the value of the samples.

If the system calculates TDOA of the localization signal between each unique pair of nodes, then the system can perform statistical techniques such as averaging to utilize the redundant TDOAs to improve the TDOA estimate. For example, given three nodes $n_1$, $n_2$, and $n_3$, the system can calculate the TDOA between $n_1$ and $n_3$ directly either by cross-correlation of the localization signals received at nodes $n_1$ and $n_3$ or by subtracting TOAs calculated at nodes $n_1$ and $n_3$ or the system can calculate the TDOAs between $n_1$ and $n_2$ and between $n_2$ and $n_3$ and sum them to find another value for the TDOA between $n_1$ and $n_3$. The system can apply statistical techniques on the overdetermined TDOA values to improve the accuracy of TDOA calculations.

8.1 Phase Difference of Arrival Measurement

In implementations wherein the device transmits a localization signal over multiple carrier frequencies, the system can also improve TDOA estimates for localization signals by recording the carrier phase offset of the received localization signal for each transmitted carrier frequency. Generally, the system can, at each node in the network, calculate a carrier phase offset of the localization signal detected at the node to generate a carrier phase offset of the localization signal detected at the node; and calculate the location of the device relative to the network based on, for each node in the network, the localization signal detected at the node, the carrier phase offset of the localization signal detected at the node, the time bias of the node, and the relative location of the node. More specifically, the system can measure multiple-frequency phase difference of arrival (hereinafter "PDOA") to improve localization of devices.

9. Multipath Detection

In Blocks S152, S156, S158, S162, S164, and S166 the system can: detect in a carrier wave a set of localization signals resulting from multipath propagation of the carrier wave; for each localization signal in the set localization signals, calculate a localization TOA in a set of localization TOAs of the localization signal; for each node in the network, select a LOS TOA from the set of localization TOAs of the node; calculate a set of TDOAs based on the LOS TOA for each node; and calculate a location of the device based on the set of TDOAs.

The system calculates the TOA for a superposed localization signal in a similar manner to the calculation of a TOA for a single localization signal. However, instead of performing a digital autocorrelation on the demodulated signal, the system can apply a cross-correlation function of a template for the analogue signal corresponding to the modulated localization signal and the analogue signal as received at the node. In a multipath environment, the autocorrelation function can output multiple peaks, which each correspond to the TOA of a multipath component of the localization signal. A common method for determining the LOS TOA from the set of multipath TOAs is to simply select the earliest TOA from the set of TOAs detected at the node as the LOS TOA. However, this method is susceptible to artifacts resulting from wireless signal propagation. This may result in the estimation of an incorrect LOS TOA. Instead the system can employ a variety of techniques leveraging localization signals over multiple frequency bands to exploit frequency, time, and/or space diversity in the localization signal in order to reject multipath signals and estimate the LOS TOA from a set of TOAs.

9.1 Frequency-Based Multipath Detection

In one implementation, the system receives a localization signal transmitted over multiple frequency bands. As such, the localization signal includes a superposition of carrier waves at different frequencies, which can be frequency-modulated versions of the same pseudorandom sequence. Because RF waves at different frequencies propagate differently through a physical environment, the timing of a set of localization TOAs resulting from the set of multipath signals received at each node may vary depending on the frequency band on which the localization signal was transmitted. However, the LOS TOA is the same (within a threshold) across frequency bands. As such, the system can reject localization TOAs in the set of localization TOAs, which are not repeated across a threshold number of frequency bands. The system can determine that two localization TOAs between frequency bands are sufficiently concurrent to consider them "repeated" if they occur within a predetermined threshold time period. Additionally or alternatively, the system can determine a LOS TOA by choosing the earliest localization TOA between the set of all localization TOAs across frequency bands.

Thus, the system can: access a frequency-divided multiplexed channel comprising a set of carrier waves, each carrier wave characterized by a different carrier frequency; detect a set of localization TOAs for each carrier wave; compare the set of localization TOAs for each carrier wave and eliminate unrepetitive localization TOAs within a predetermined TOA threshold to generate a remaining set of TOAs; and select a LOS TOA for each node from the remaining set of TOAs from the node.

9.2 MIMO Multipath Detection

In one implementation, the system can achieve spatial diversity by utilizing multiple-input/multiple output (hereinafter "MIMO") multipath detection. In this implementation, nodes in the network are MIMO and include multiple antennas in different physical locations on the node. The displacement of the antennas relative to each other can be suitably small such that TOAs of localization signals are sufficiently similar across antennas, while the multipath signals received at each antenna are significantly different. In this implementation, each node records an incoming carrier wave including the modulated localization signal at each antenna of the node. The system then calculates a set of localization TOAs resulting from the multipath environment between the device and each antenna. The system can then eliminate localization TOAs that are not repeated across antennas in a similar manner to the above described process for frequency-based multipath detection. Alternatively or additionally, the system can select an earliest localization TOA, across the set of localization TOAs from all antennas, as the LOS TOA.

9.2 Time Domain Multipath Detection

In one implementation, the system can achieve time diversity by utilizing time domain multipath rejection. In this implementation, the device can transmit the localization signal periodically within a short time period at predetermined time offsets. As a result, each localization signal in the series of localization signals may encounter varying levels of interference in the multipath wireless environment. The system can then subtract the predetermined time offsets between each of the localization signals to align the localization signals and calculate a set of a localization TOAs for each localization signal. The system can then select the earliest detected localization TOA from across the time-separated localization signals as the LOS TOA.

10. TDOA Bounding

After the system has calculated a set of TDOAs at each node, the system can also apply TDOA bounding techniques to improve the likelihood of calculating an accurate TDOA between each pair of nodes in the network. The system can implement a bounding model to reject TDOAs that are inconsistent with prior information regarding the node's location or the scale of the area throughout which the nodes are distributed. Depending on the implementation, the system can perform TDOA bounding before or after calculating LOS TOAs. For example, the system can calculate all possible TDOAs between two nodes (by computing the difference between each TOA calculated at a first node with each TOA calculated at the second node) and then reject TDOAs outside of a bounding function. Alternatively, the system can first select LOS TOAs for each node and then reject TDOAs calculated based on the LOS TOAs. In implementations that include multi-banded localization signals, the system can apply TDOA bounding to either TOAs or TDOAs calculated across multiple bands. In one implementation, the system can reject TDOAs that correspond to a greater distance than the pairwise distance between the two nodes for which the TDOA was calculated. Additionally or alternatively, if the system is localizing devices within a known region, the TDOA bound can be decreased to reflect the maximum TDOA of a transmission originating from the known region.

11. Multilateration

After the system has calculated a TDOA for each pair of nodes in the network, the system can perform multilateration to: calculate a location of the device relative to the network based on, for each node in the network, the localization signal detected at the node, the time bias of the node, and the relative location of the node as in Block S160, S168, and S170. In one implementation, the system can calculate a number of locations for a device and define an area where the device maybe located. Additionally or alternatively, the system can calculate a location of the device with an uncertainty in each dimension indicating the probable location of the device within a predetermined level of confidence. The system calculates the location of the device in the same coordinate system for which the relative location of each node in the network is known such that the location calculated for the device is also relative to the nodes. Generally, the system can calculate the two-dimensional relative location of a device with three nodes (of known location) in the network and the three-dimensional location of a device with four nodes (of known location) in the network. With TDOAs from a larger number of nodes (i.e. greater than four), the system can execute, the least squares method, and/or linear or non-linear optimization to refine the location of the device. Additionally or alternatively, Kalman filters or other filtering functions can be applied to the location estimate of a particular device over time.

The system executes multilateration by solving a system of equations of the form:

$$ct_{i,j} = \sqrt{(x_i-x)^2+(y_i-y)^2+(z_i-z)^2} - \sqrt{(x_j-x)^2+(y_j-y)^2+(z_j-z)^2}$$

where $t_{i,j}$ is the TDOA between nodes i and j; $x_i$, $y_i$, and $z_i$ are the coordinates of node i; $x_j$, $y_j$, and $z_j$ are the coordinates of node j; and x, y, and z are the coordinates of the device.

12. Deployment

The system can be deployed in a number of wireless networking scenarios as well as in any scenario involving wave propagation at a consistent speed between and amongst multiple nodes. Some examples of deployments of the system include a local asset tracking deployment, a telecommunication deployment, and a global satellite deployment.

12.1 Local Asset Tracking Deployment

The system can be deployed as an asset tracking system. In this implementation, the system can include a network of nodes placed around a warehouse, assembly line/factory, hospital, school, office building, or any other facility. The nodes can be distributed around the facility avoiding obstructions and insuring that at least four nodes can receive localization signals from devices distributed throughout the facility (if three-dimensional location tracking is desired). The system can also include a set of active tags that can be attached to assets to be tracked and can transmit localization signals for reception by the nodes. Additionally, the local deployment can track other transmitting devices within or around the facility.

12.2 Telecommunication Deployment

The system can be deployed in a telecommunication setting, wherein each node comprises a cellular site and the network comprises a cellular network. The method S100 can be implemented in existing or retrofitted cellular sites. By leveraging the telecommunication infrastructure at a cellular site, the system's range can be increased and, therefore, the system can locate cellular devices or other transmitters within range of the cellular network. After calculating the location information of a cellular device, the system can then transmit the location information of a cellular device to the cellular device via the cellular network. Thus, the system can enable accurate location services for cellular devices in the cellular network.

12.2 Global Satellite Deployment

The system can be deployed as a global satellite network, wherein each node comprises a LEO satellite and the network comprises a geolocation system. The method S100 can be adapted to a global location tracking application by compensating for relativistic and atmospheric effects on the localization and synchronization signals. One advantage of a global satellite deployment of the system when compared to other global navigation systems is that the satellites executing the method S100 do not require continuous tracking and updating via an almanac. Instead each satellite acting as a node can repeatedly self-locate and time synchronize before localizing transmitters on or around earth. Thus, because the system does not require continual tracking or prior knowledge of the orbital positions/velocities, maintenance costs are reduced when compared to existing global navigation systems. A global satellite deployment of the system can localize transmitters anywhere on earth similar to GPS or other global navigation systems.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
for each pair of nodes in a set of nodes:
at each node in the pair of nodes:
transmitting an outbound synchronization signal;
generating a self-receive signal based on the outbound synchronization signal;
detecting the self-receive signal at a self-receive time-of-arrival, in a set of self-receive times-of-arrival; and
detecting an inbound synchronization signal, transmitted from an opposing node in the pair of nodes, at a synchronization time-of-arrival, in a set of synchronization times-of-arrival;
at each node in the set of nodes, detecting a localization signal, transmitted by a device, at a localization time-of-arrival; and
calculating a location of the device relative to the set of nodes based on the localization time-of-arrival at each node in the set of nodes, the set of self-receive times-of-arrival, and the set of synchronization times-of-arrival.

2. The method of claim 1:
further comprising, for each pair of nodes in a set of nodes:
based on the set of self-receive times-of-arrival and the set of synchronization times-of-arrival:
calculating a pairwise time offset between the pair of nodes, in a set of pairwise time offsets; and calculating a pairwise distance between the pair of nodes, in a set of pairwise distances; and wherein calculating the location of the device relative to the set of nodes based on the localization time-of-arrival at each node in the set of nodes, the set of self-receive times-of-arrival, and the set of synchronization times-of-arrival further comprises calculating the location of the device relative to the set of nodes based on the localization time-of-arrival at each node in the set of nodes, the set of pairwise time offsets, and the set of pairwise distances.

3. The method of claim 2:

further comprising, for each node in the set of nodes:
based on the set of pairwise distances, calculating a relative location of the node; and
based on the set of pairwise time offsets, calculating a time bias of the node; and wherein calculating the location of the device relative to the set of nodes based on the localization time-of-arrival at each node in the set of nodes, the set of pairwise time offsets, and the set of pairwise distances further comprises calculating the location of the device relative to the set of nodes based on the localization time-of-arrival at each node in the set of nodes, the time bias of each node in the set of nodes, and the relative location of each node in the set of nodes.

4. The method of claim 1 further comprising:

for each pair of nodes in the set of nodes, during a synchronization slot corresponding to the pair of nodes:
at each node in the pair of nodes:
transmitting the outbound synchronization signal;
generating the self-receive signal based on the outbound synchronization signal;
detecting the self-receive signal at the self-receive time-of-arrival, in the set of self-receive times-of-arrival; and
detecting the inbound synchronization signal, transmitted from the opposing node in the pair of nodes, at the synchronization time-of-arrival, in the set of synchronization times-of-arrival;

at each node in the set of nodes, detecting the localization signal, transmitted by the device, at the localization time-of-arrival; and calculating the location of the device relative to the set of nodes based on the localization time-of-arrival at each node in the set of nodes, the set of self-receive times-of-arrival, and the set of synchronization times-of-arrival.

5. A method comprising:

at each node in a set of nodes:
transmitting an outbound synchronization signal;
generating a self-receive signal based on the outbound synchronization signal;
detecting the self-receive signal at a self-receive time-of-arrival, in a set of self-receive times-of-arrival; and
for each inbound synchronization signal in a set of inbound synchronization signals from other nodes in the set of nodes, detecting a synchronization time-of-arrival of the inbound synchronization signal, in a set of synchronization times-of-arrival;
detecting a localization signal, transmitted by a device, at a localization time-of-arrival, in a set of localization times-of-arrival;

calculating a location of the device based on the set of self-receive times-of-arrival, the set of synchronization times-of-arrival, and the set of localization times-of-arrival.

6. The method of claim 5:

further comprising, for each node in the set of nodes, based on the set of self-receive times-of-arrival and the set of synchronization times-of-arrival:
calculating a time bias of the node, in a set of time biases, relative to each other node in the set of nodes; and
calculating a pairwise distance, in a set of pairwise distances, between the node and each other node in the set of nodes;

wherein calculating the location of the device based on the set of self-receive times-of-arrival, the set of synchronization times-of-arrival, and the set of localization times-of-arrival further comprises calculating the location of the device based on the set of time biases, the set of pairwise distances, and the set of localization times-of-arrival.

7. The method of claim 5:

further comprising, for each node in the set of nodes:
calculating a localization time-difference-of-arrival, in a set of localization time-differences-of-arrival, based on the set of localization times-of-arrival; and wherein calculating the location of the device based on the set of self-receive times-of-arrival, the set of synchronization times-of-arrival, and the set of localization times-of-arrival further comprises calculating a location of the device based on the set of self-receive times-of-arrival, the set of synchronization times-of-arrival, and the set of localization time-differences-of-arrival.

8. A method comprising:

at a first node:
transmitting a first synchronization signal;
generating a first self-receive signal based on the first synchronization signal; and
detecting the first self-receive signal at a first self-receive time-of-arrival;

at a second node:
transmitting a second synchronization signal;
generating a second self-receive signal based on the second synchronization signal;
detecting the second self-receive signal at a second self-receive time-of-arrival; and
receiving the first synchronization signal at a first synchronization time-of-arrival;

at the first node:
receiving the second synchronization signal at a second synchronization time-of-arrival; and
receiving a first localization signal, transmitted by a first device, at a first localization time-of-arrival;

at the second node, receiving the first localization signal at a second localization time-of-arrival; and calculating a location of the first device based on the first synchronization time-of-arrival, the second synchronization time-of-arrival, the first self-receive time-of-arrival, the second self-receive time-of-arrival, the first localization time-of-arrival, and the second localization time-of-arrival.

9. The method of claim 8:

further comprising:
at the first node in a set of nodes:
transmitting the first synchronization signal;

generating the first self-receive signal based on the first synchronization signal; and detecting the first self-receive signal at the first self-receive time-of-arrival in a set of self-receive times-of-arrival detected by each node in the set of nodes;

at the second node in the set of nodes:

transmitting the second synchronization signal;

generating the second self-receive signal based on the second synchronization signal;

detecting the second self-receive signal at the second self-receive time-of-arrival in the set of self-receive time-of-arrivals; and receiving the first synchronization signal at the first synchronization time-of-arrival in a set of synchronization times-of-arrival based on reception of synchronization signals at each node in the set of nodes;

at the first node in the set of nodes:

receiving the second synchronization signal at the second synchronization time-of-arrival in the set of synchronization times-of-arrival; and receiving the first localization signal, transmitted by the first device, at the first localization time-of-arrival in a set of localization times-of-arrival based on reception of the first localization signal at each node in the set of nodes; and at the second node in the set of nodes, receiving the first localization signal at the second localization time-of-arrival in the set of localization times-of-arrival; and wherein calculating the location of the first device based on the first synchronization time-of-arrival, the second synchronization time-of-arrival, the first self-receive time-of-arrival, the second self-receive time-of-arrival, the first localization time-of-arrival, and the second localization time-of-arrival further comprises calculating the location of the first device based on the set of self-receive times-of-arrival, the set of synchronization times-of-arrival, and the set of localization times-of-arrival.

10. The method of claim 9, wherein the set of nodes comprises a set of at least five nodes and the location of the first device comprises a three-dimensional location of the first device.

11. The method of claim 8, wherein calculating the location of the first device based on the first synchronization time-of-arrival, the second synchronization time-of-arrival, the first self-receive time-of-arrival, the second self-receive time-of-arrival, the first localization time-of-arrival, and the second localization time-of-arrival further comprises:

calculating a pairwise time offset between the first node and the second node based on the first synchronization time-of-arrival, the second synchronization time-of-arrival, the first self-receive time-of-arrival, and the second self-receive time-of-arrival;

calculating a pairwise distance between the first node and the second node based on the first synchronization time-of-arrival, the second synchronization time-of-arrival, the first self-receive time-of-arrival, and the second self-receive time-of-arrival; and calculating the location of the first device based on the pairwise time offset, the pairwise distance, the first localization time-of-arrival, and the second localization time-of-arrival.

12. The method of claim 11, wherein calculating the location of the first device based on the pairwise time offset, the pairwise distance, the first localization time-of-arrival, and the second localization time-of-arrival further comprises adjusting the first localization time-of-arrival relative to the second localization time-of-arrival based on the pairwise time offset.

13. The method of claim 11, wherein calculating the location of the first device based on the pairwise time offset, the pairwise distance, the first localization time-of-arrival, and the second localization time-of-arrival further comprises:

calculating a second location of the first node based on the pairwise distance;

calculating a third location of the node based on the pairwise distance; and calculating the location of the first device based on the pairwise time offset, the second location of the first node, the third location of the second node, the first localization time-of-arrival, and the second localization time-of-arrival.

14. The method of claim 11:

wherein calculating the pairwise time offset further comprises evaluating:

$$b_1 - b_2 = \frac{1}{2}[(S_{1,2} - S_{2,2}) - (S_{2,1} - S_{1,1})]$$

wherein $b_1 - b_2$ represents the pairwise time offset, $S_{1,2}$ represents the second synchronization time-of-arrival, $S_{2,1}$ represents the first synchronization time-of-arrival, $S_{1,1}$ represents the first self-receive time-of-arrival, and $S_{2,2}$ represents the second self-receive time-of-arrival; and wherein calculating the pairwise distance further comprises evaluating:

$$d_{1,2} = c\frac{1}{2}[(S_{1,2} - S_{2,2}) + (S_{2,1} - S_{1,1})]$$

wherein $d_{1,2}$ represents the pairwise distance and c represents a signal propagation speed.

15. The method of claim 8, further comprising:

at the first node and during a synchronization slot according to a first clock of the first node, transmitting the first synchronization signal, the synchronization slot characterized by a duration greater than an estimated time offset between the first node and the second node;

at the second node and during the synchronization slot according to a second clock of the second node, transmitting the second synchronization signal.

16. The method of claim 15, further comprising:

at the first node during a header slot, receiving timing information for the synchronization slot; and at the second node during the header slot, receiving timing information for the synchronization slot.

17. The method of claim 8, further comprising:

calculating a frequency offset between the first node and the second node during a calibration slot prior to the synchronization slot;

at the first node and during a synchronization slot according to a first clock of the first node adjusted based on the frequency offset, transmitting the first synchronization signal, the synchronization slot characterized by a duration greater than an estimated time offset between the first node and the second node;

at the second node and during the synchronization slot according to a second clock of the second node adjusted based on the frequency offset, transmitting the second synchronization signal.

18. The method of claim 8, further comprising:

at the first node and during a first synchronization sub-slot in a synchronization slot according to a first clock of the first node, transmitting the first synchronization signal; and at the second node and during a second synchronization sub-slot in the synchronization slot according to the second clock of the second node, transmitting the second synchronization signal, wherein the second synchronization sub-slot is offset from the first synchronization sub-slot by a buffer duration greater than an estimated time offset between the first node and the second node.

19. The method of claim 8, further comprising:

at the first device, transmitting the first localization signal during a first localization slot according to a first clock of the first device, a duration of the first localization slot based on an expected drift rate of the first clock of the first device;

at the first node and during the first localization slot according to a second clock of the first node, receiving the first localization signal at the first localization time-of-arrival; and at the second node and during the first localization slot according to a third clock of the second node, receiving the first localization signal at the second localization time-of-arrival.

20. The method of claim 8, further comprising:

at the first device, transmitting the first localization signal during a first localization slot according to a first clock of the first device, a timing of the first localization slot based on a first standardized wireless protocol executed by the first device;

at the first node and during the first localization slot according to a second clock of the first node, receiving the first localization signal at the first localization time-of-arrival; and at the second node and during the first localization slot according to a third clock of the second node, receiving the first localization signal at the second localization time-of-arrival.

\* \* \* \* \*